(12) United States Patent
Goederer et al.

(10) Patent No.: US 11,675,096 B2
(45) Date of Patent: Jun. 13, 2023

(54) PHOTON-COUNTING X-RAY DETECTOR AND METHOD FOR OPERATING A PHOTON-COUNTING X-RAY DETECTOR

(71) Applicant: Siemens Healthcare GmbH, Erlangen (DE)

(72) Inventors: Edgar Goederer, Forchheim (DE); Martin Hupfer, Erlangen (DE); Bjoern Kreisler, Hausen (DE); Martin Petersilka, Adelsdorf (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 0 days.

(21) Appl. No.: 17/116,068

(22) Filed: Dec. 9, 2020

(65) Prior Publication Data
US 2021/0190979 A1    Jun. 24, 2021

(30) Foreign Application Priority Data
Dec. 18, 2019    (EP) .................................... 19217565

(51) Int. Cl.
*G01T 1/24*    (2006.01)
(52) U.S. Cl.
CPC .................... *G01T 1/247* (2013.01)
(58) Field of Classification Search
None
See application file for complete search history.

(56) References Cited

U.S. PATENT DOCUMENTS

| 8,772,730 B2 * | 7/2014 | Han | G01T 1/18 |
| | | | 250/370.09 |
| 2014/0175299 A1 | 6/2014 | Spahn | |

(Continued)

FOREIGN PATENT DOCUMENTS

| DE | 102012224209 A1 | 7/2014 |
| DE | 102015215086 A1 | 2/2017 |
| EP | 3839577 A1 | 6/2021 |
| WO | WO 2017144474 A1 | 8/2017 |

OTHER PUBLICATIONS

Loeliger, T. et al., "The New PILATUS3 ASIC with Instant Retrigger Capability", 2012 IEEE Nuclear Science Symposium and Medical Imaging Conference Record (NSS/MIC); https://doi.org/610-615.10.1109/NSSMIC.2012.6551180, 2012.

(Continued)

*Primary Examiner* — Edwin C Gunberg
(74) *Attorney, Agent, or Firm* — Harness, Dickey & Pierce, P.L.C.

(57) ABSTRACT

An X-ray detector includes a converter element for converting X-rays into electric signals; and a plurality of pixel elements. In an embodiment, each pixel element includes a first signal processing stage for processing respective electric signals with at least one signal amplifier and at least one comparator for providing a digital pixel signal. The signal outputs of the first signal processing stage of at least one group of pixel elements are coupled via signal technology to a common second signal processing stage including a multiplicity of digital logic elements. The common second signal processing stage includes a configurable switching matrix for interconnecting at least one partial number of the multiplicity of digital logic elements with the respective signal outputs of the first signal processing stage, so that, following a configuration of the switching matrix, a processing chain can be provided for the digital processing of the digital pixel signals.

20 Claims, 9 Drawing Sheets

(56) References Cited

U.S. PATENT DOCUMENTS

| | | |
|---|---|---|
| 2017/0038479 A1 | 2/2017 | Goderer et al. |
| 2018/0196149 A1* | 7/2018 | Blevis .................... G01T 1/243 |
| 2019/0056517 A1 | 2/2019 | Alving et al. |
| 2021/0186439 A1 | 6/2021 | Goederer et al. |
| 2021/0186440 A1 | 6/2021 | Kreisler et al. |

OTHER PUBLICATIONS

Kraft, E. et. al., "Experimental evaluation of the Pile-Up Trigger method in a revised quantum-counting CT detector", Proc. SPIE 8313, Medical Imaging 2012: Physics of Medical Imaging, 83134A; https://doi.org/10.1117/12.911231, 2012.

European Search Report for European Application No. 19217565.1 dated Jun. 19, 2020.

* cited by examiner

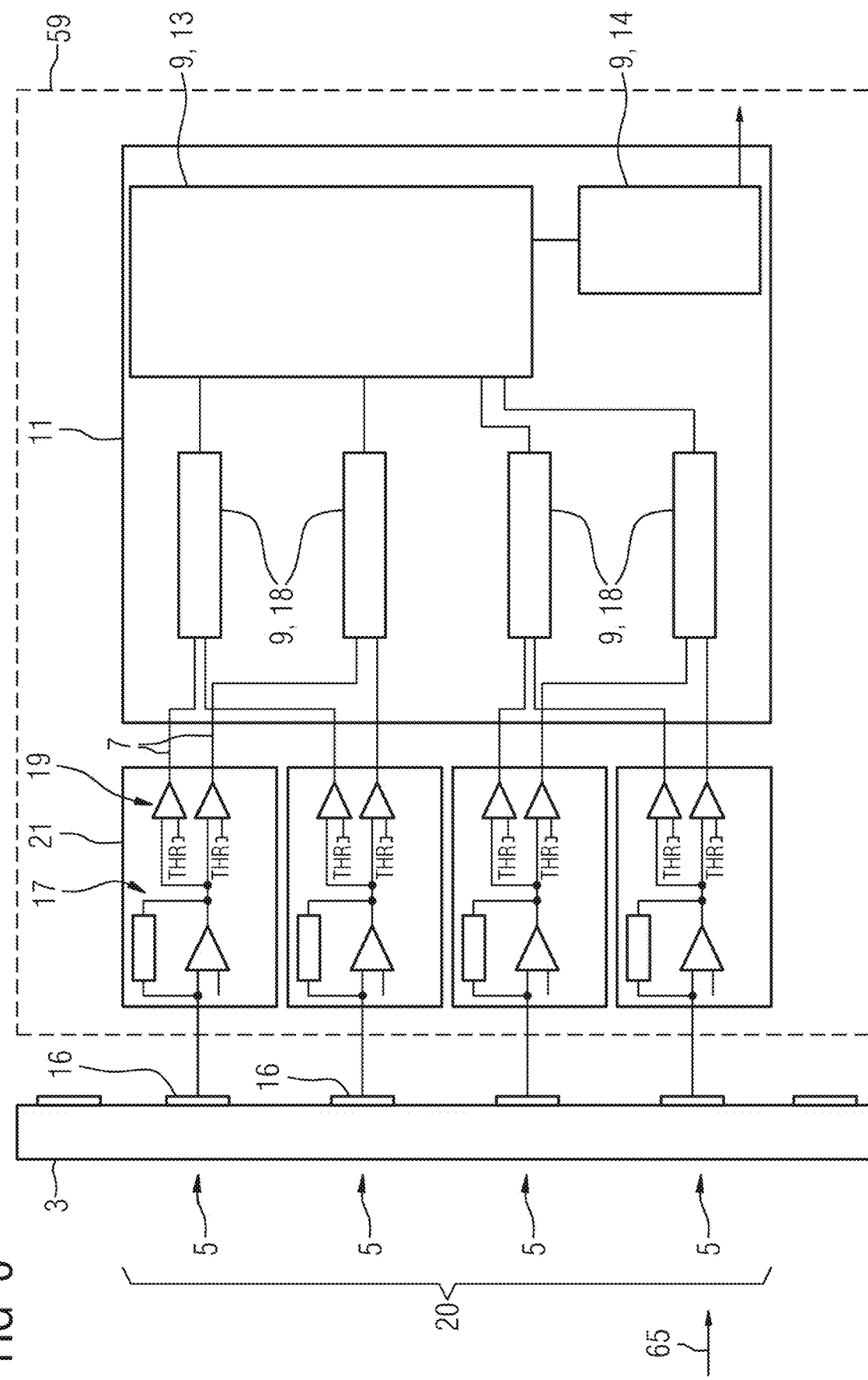

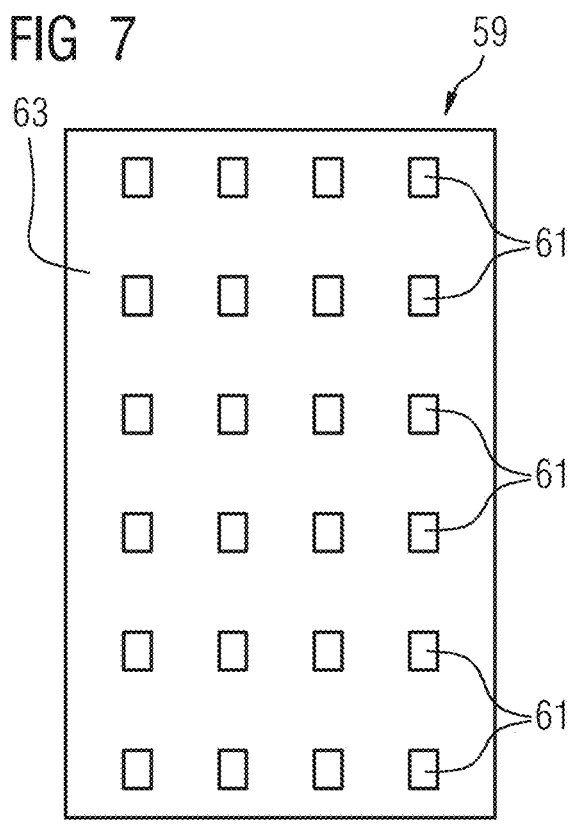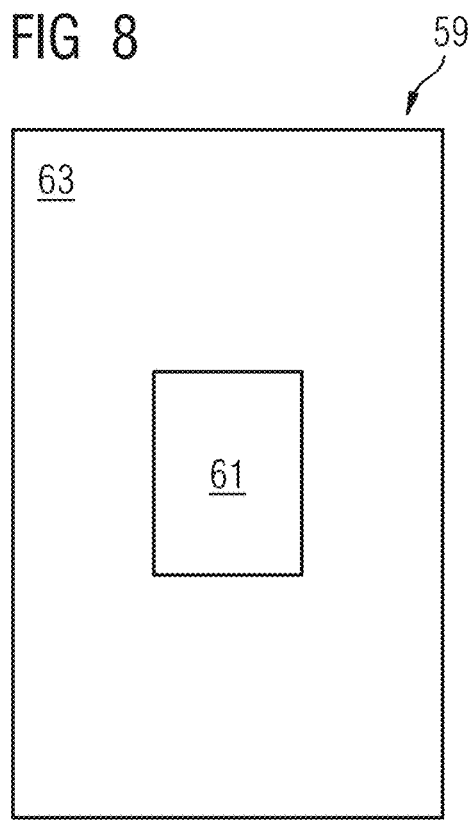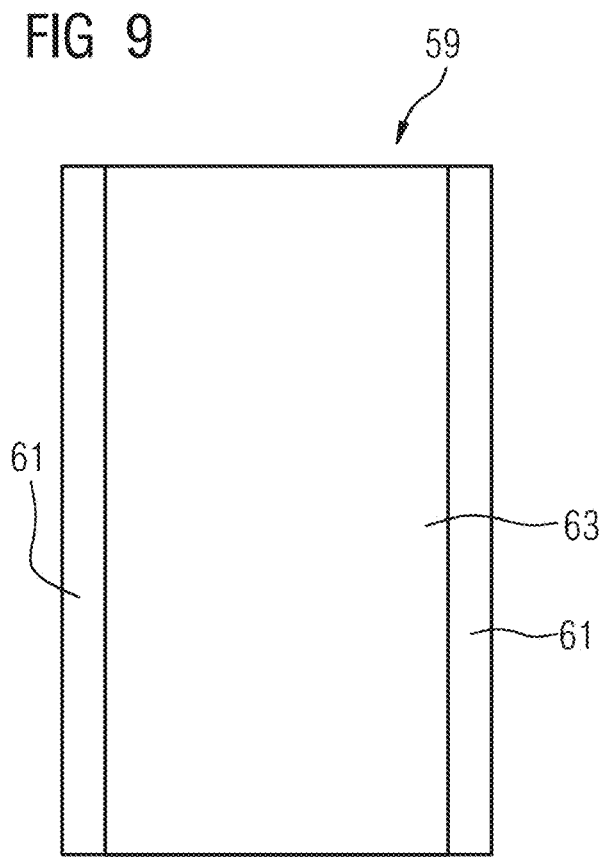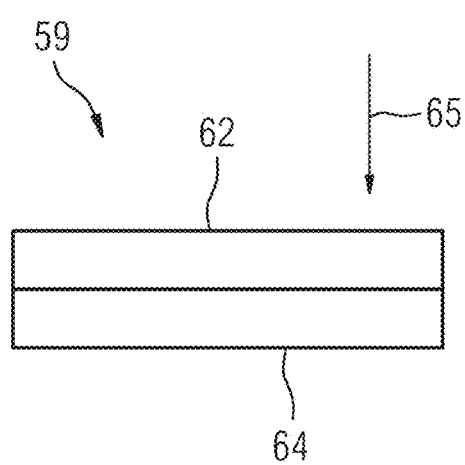

PHOTON-COUNTING X-RAY DETECTOR AND METHOD FOR OPERATING A PHOTON-COUNTING X-RAY DETECTOR

PRIORITY STATEMENT

The present application hereby claims priority under 35 U.S.C. § 119 to European patent application number EP19217565.1 filed Dec. 18, 2019, the entire contents of which are hereby incorporated herein by reference.

FIELD

Example embodiments of the application generally relate to a photon-counting X-ray detector for recording an X-ray image data set, a medical imaging device having a photon-counting X-ray detector and a method for operating the photon-counting X-ray detector.

BACKGROUND

Photon-counting X-ray detectors are used in numerous imaging applications. For example, such X-ray detectors are used in computed tomography scanners in medical imaging in order to create a tomographic X-ray image of a region of interest of a patient.

In particular a photon-counting direct-conversion X-ray detector can be used as a photon-counting X-ray detector. In such X-ray detectors, arriving X-rays or photons can be converted into electric pulses by way of a suitable converter material. The electric pulses are evaluated by evaluation electronics, for example an integrated circuit (application specific integrated circuit, ASIC). In counting X-ray detectors, incident X-rays are then measured by counting the electric pulses which are triggered by the absorption of X-ray photons in the converter material. In addition, as a rule, the height or also the length of a created electric pulse is proportional to the energy of the absorbed X-ray photon. This enables the extraction of spectral information by comparing the height or length of the electric pulse with an energy threshold. Photon-counting X-ray detectors frequently have multiple adjustable energy thresholds for a comparison thereby enabling energy-triggered measurements as a function of multiple energy regions defined by the energy thresholds. The use of photon-counting detectors in X-ray imaging offers a series of advantages compared to energy-integrating detectors. For example, they enable high spatial resolution and an intrinsically energy-triggered measurement.

The processing of the electric signals generated in the converter element usually starts initially with electric signal amplification and shaping. Depending upon the embodiment, here the signals from multiple adjacent pixels are combined (called "charge summing"). Then, the level of the resulting signals is usually compared via one or more comparators with one or more threshold values. The digitized signal can then be processed in different ways: for example, the number of times the comparator's threshold is exceeded can be counted, for example by counting a rising clock-pulse edge via a so-called "rising edge counter", the comparator signals from multiple adjacent pixels can be offset, for example via gating or a coincidence logic, count values of adjacent counters can be offset, for example via fusing, summing, a point in time ("time-of-arrival") and/or duration ("time-over-threshold") of the comparator signals can be determined and much more.

However, typically only one or two of these methods are actually implemented in the ASIC and the sequence specified during the design process. The pixel-by-pixel circuit is also usually implemented identically for each pixel and additionally optionally a cross-pixel communication logic incorporated with which the information obtained can be read out from the ASIC.

SUMMARY

At least one embodiment of the invention provides an improved X-ray detector for flexible use.

Further advantageous embodiments that are in part inventive per se and developments of the invention are set forth in the claims and the following description.

At least one embodiment of the invention relates to a photon-counting X-ray detector comprising:

a converter element to convert X-rays into electric signals; and a plurality of pixel elements, each respective pixel element of the plurality of pixel elements including a first signal processing stage to respectively process the electric signals with at least one signal amplifier and at least one comparator to provide a digital pixel signal at a respective signal output of the first signal processing stage of the respective pixel element of the plurality of pixel elements, the respective signal outputs of the first signal processing stage of at least one group of pixel elements of the plurality of respective pixel elements being coupled via signal technology to a common second signal processing stage including a multiplicity of digital logic elements, to digitally process the digital pixel signals provided, the common second signal processing stage including a configurable switching matrix for interconnecting via signal technology, at least one partial number of the multiplicity of digital logic elements with the respective signal outputs of the first signal processing stage of the group of pixel elements of the plurality of pixel elements, so that, following a configuration of the switching matrix, a processing chain is provided for digital processing of the digital pixel signals provided for each respective signal output of the first signal processing stage of the group of pixel elements of the plurality of pixel elements.

At least one embodiment of the invention also relates to a medical imaging device having a photon-counting X-ray detector according to at least one embodiment of the invention.

At least one embodiment of the invention also relates to a method for operating a photon-counting X-ray detector for creating an X-ray image data set, wherein the at least one switching matrix of the photon-counting X-ray detector is configurable via adjustable register parameters, the method comprising:

adapting the adjustable register parameters based on a first set of register parameter values;

configuring the at least one switching matrix based on the adapted register parameters and respectively providing a digital processing chain for at least one part of respective signal outputs of a first signal processing stage of the photon-counting X-ray detector, of at least one group of pixel elements of the photon-counting X-ray detector, coupled to the at least one switching matrix via signal technology;

receiving X-rays with the photon-counting X-ray detector, for creation of electric signals in a converter element of the photon-counting X-ray detector;

processing the electric signals created via the first processing stage and a second processing stage of the photon-counting X-ray detector, wherein respective digital pixel signals are provided at respective signal outputs of the first signal processing stage of a pixel element of the at least one group of pixel elements of the plurality of pixel elements of the photon-counting X-ray detector, the respective digital pixel signals being further processed via a digital processing chain, respectively provided in the second signal processing stage for a respective signal output; and outputting processed digital pixel signals, for creation of the X-ray image data set.

BRIEF DESCRIPTION OF THE DRAWINGS

The following describes the invention with reference to example embodiments and with reference to the attached figures. The representation in the figures is schematic, greatly simplified and not necessarily true to scale. The figures show.

DETAILED DESCRIPTION OF THE EXAMPLE EMBODIMENTS

Figure 1:
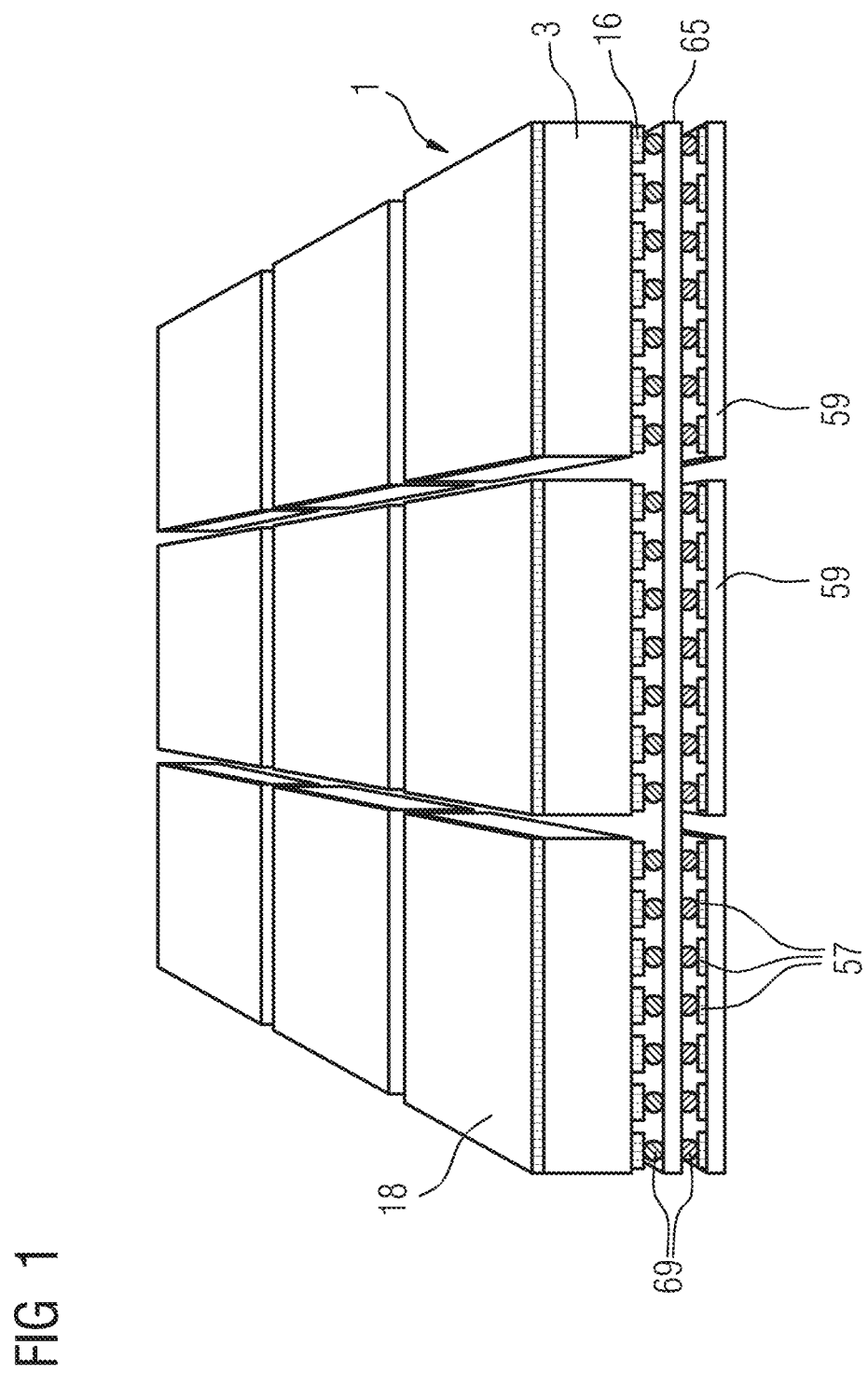
FIG. 1 a schematic view of an example embodiment of an X-ray detector 1.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one embodiment of the present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

At least one embodiment of the invention relates to a photon-counting X-ray detector comprising a converter element for converting X-rays into electric signals and a plurality of pixel elements, wherein a. each pixel element of the plurality of pixel elements comprises a first signal processing stage for processing the electric signals in each case with at least one signal amplifier and at least one comparator for providing a digital pixel signal at a respective signal output of the first signal processing stage of a pixel element of the plurality of pixel elements, b. the signal outputs of the first signal processing stage of at least one group of pixel elements of the plurality of pixel elements are coupled to a common second signal processing stage via signal technology comprising a multiplicity of digital logic elements for digitally processing the digital pixel signals provided, c. the common second signal processing stage comprises a configurable switching matrix for interconnecting via signal technology at least one partial number of the multiplicity of digital logic elements with signal outputs of the first signal processing stage of the group of pixel elements of the plurality of pixel elements, d. so that, following a configuration of the switching matrix for each signal output of the first signal processing stage of the group of pixel elements of the plurality of pixel elements, a processing chain can be provided for the digital processing of the digital pixel signals provided.

The photon-counting X-ray detector used in the context of at least one embodiment of the invention can also be called a direct-conversion X-ray detector. Direct-conversion X-ray detectors are generally implemented in a stack structure with which an assigned evaluation unit is connected to a position on the underside of the converter material, i.e. to the converter element. The underside of the converter element usually comprises a multiplicity of electrodes in a matrix shape, hereinafter also called sensor pixel electrodes, in the form of metallized contact elements. The evaluation unit is in contact with these via signal transmission technology, for example soldered.

Herein, usually in each case a pixel-shaped mating contact element, hereinafter also called a pixel electrode, is located on the side of the evaluation-side opposite a converter-side contact element. The evaluation unit then usually provides pixel-by-pixel pixel electronics for the pixel-by-pixel processing of an incoming signal via the pixel electrodes. Arriving X-rays are converted into charge carriers in the converter material of the converter element as a function of the locally deposited energy of an X-ray photon on the basis of which a signal, usually an electric pulse, is created in the pixel-by-pixel pixel electronics and then further processed. Pixel-by-pixel pixel electronics can be assigned a corresponding detection volume in the converter element which is substantially embodied by the electric field between a respective sensor pixel electrode and a top electrode applied to the opposite side of the converter element and which forms the sensitive detection volume of a pixel element.

According to at least one embodiment of the invention, each pixel element of the plurality of pixel elements of the photon-counting X-ray detector according to at least one embodiment of the invention has a first pixel-by-pixel signal processing stage which substantially provides analog processing of the incoming signal via a pixel electrode of a pixel element. In particular, the incoming signal is amplified via the signal amplifier according to at least one embodiment of the invention of the first signal processing stage and the amplified signal is compared via the at least one comparator with at least one threshold value representing an energy threshold. If the signal exceeds the threshold value, an output signal is output at the comparator. Hence, the transition to a digital signal (or multiple digital signals) substantially takes place in this step so that a digital pixel signal for further processing in the second signal processing stage is provided at a respective signal output of the first signal processing stage.

The first signal processing stage of a pixel element of the plurality of pixel elements can also comprise more than one comparator with a threshold value in each case so that multiple digital pixel signals are provided as a function of the threshold values at multiple signal outputs of the first signal processing stage of a pixel element of the plurality of pixel elements.

According to at least one embodiment of the invention, at least one group of pixel elements of the plurality of pixel elements of the photon-counting X-ray detector comprises a common second signal processing stage. In each case a selected partial number of the plurality of pixel elements is combined in a group. Consequently, the second common signal processing stage is provided jointly for at least the pixel elements in the group. All of the plurality of pixel elements can be interconnected with a common processing stage. This means that the at least one group can include the entire plurality. However, the plurality of pixel elements can also be divided into multiple groups, wherein each group is in each case interconnected with a common second processing stage.

The multiplicity of digital logic elements provided in the second signal processing stage can then be understood to be common resources provided for the digital signal processing of the digital pixel signals which can be used jointly for the signal processing of the digital pixel signals from the pixel elements in the group of the plurality of pixel elements. Herein, a digital logic element can in particular be understood to be an electronic circuit which ascertains one or more output variables from one or more digitally represented input signals and from a set of configuration signals or control signals. Herein, the circuit can also have internal storage elements which have an impact on the processing of the input signals (or the values of the storage elements). Herein, the mode of operation of the circuit can be clocked, combinational or event-driven.

The second signal processing stage includes a configurable switching matrix which can be configured for the interconnection of the signal outputs assigned to a second signal processing stage so that a processing chain of the digital pixel signal output via the signal output can be provided for each assigned signal output based on a selection of the digital logic elements provided. A processing chain in particular represents the interconnection and series connection of the digital logic elements and a respective signal output so that the interconnection enables the processing of a signal output at the signal output. Then, one or also more processed digital signals can be provided at the end of the processing chain depending upon the interconnection. Therefore, the configurable switching matrix enables a configurable interconnection of the signal outputs with at least one selection of the logic elements provided. Similarly, the switching matrix can enable a configurable interconnection of the logic elements with one another.

The selection of digital logic elements comprises at least a partial number of the digital logic elements provided. The logic elements can in each case be interconnected with one or more signal outputs of the first signal processing stage and/or in each case again with one or more digital logic elements.

The processed digital pixel signal or signals can be, but do not necessarily have to be, assignable to a specific pixel element. The processed pixel signal or signals can also in each case be based on a multiplicity of digital pixel signals from different signal outputs and thereby also of different pixel elements of the group. For example, the digital pixel signals from different signal outputs can be offset against one another, for example by way of coincidence logic or summation logic.

Herein, the switching matrix can be embodied as an FPGA ("field-programmable gate array"). This means that the switching matrix can be embodied as an integrated circuit into which a logic circuit can be loaded, wherein the desired circuit structure can be defined, i.e. adapted by programming or configuring the switching matrix. As a result, the configuration of the internally present digital logic elements enables different circuits and functions to be implemented and in particular repeatedly reconfigured. The switching matrix can in particular be reconfigured after the delivery of the X-ray detector, during run time and for different measurements and applications. This enables the signal processing chain of the digital pixel signals and thereby the functions of the X-ray detector to be provided as adaptable and configurable.

Herein, a processing chain can at least be provided for each signal output interconnected with the common second signal processing stage. However, configurations of the switching matrix in which processing of selected signal outputs is not provided, i.e. with which no processing chain is provided following a configuration of the switching matrix, are also possible. This is in particular the case when certain pixel signals are to be dispensed with in return for, for example, lower data rates, lower power consumption or the like. This means that, following a configuration of the switching matrix, in each case a digital processing chain can be provided for at least one part or even all of the signal outputs of the first signal processing stage of the at least one group of pixel elements.

Preferably, a processing chain of digital logic elements can in each case be individually configurable for each signal output linked to a common second signal processing stage. However, there may also be embodiment variants of the photon-counting X-ray detector with which the signal processing chains for the signal outputs of the pixel elements in a group in each case can only be configured jointly so that in each case identical processing chains for the provided digital pixel signals from a pixel element are provided for each pixel element. However, this may nevertheless include the fact that different signal processing chains of logic elements are provided for different pixel signals from a pixel element.

Therefore, in this context, the first signal processing stage can be understood as being embodied by pixel-by-pixel pixel electronics. Then in each case a first signal processing stage, a corresponding pixel or sensor pixel electrode and a detection volume in the converter element can be assigned to a pixel element according to the invention of the plurality of pixel elements. On the other hand, although the second signal processing stage can in each case provide the digital processing chain of the pixel-by-pixel pixel signals, it cannot be assigned as a whole to a single specific pixel element but only to a group of pixel elements.

The implementation of the X-ray detector according to at least one embodiment of the invention advantageously enables the analog and digital signal processing to be decoupled to a greater extent. Advantageously, the analog signal processing (amplification and comparator) can be performed as close to the sensor as possible and the digital further processing can be applied significantly abstracted and jointly for a pixel group.

The abstraction of the digital signal processing enables high flexibility and reusability of the evaluation unit. Assembling pixel groups by way of a configurable matrix readout, i.e. a second signal processing stage with a configurable switching matrix, advantageously enables measurement-adapted processing of the pixel signals. Advantageously, the interconnection of the logic elements provided can be configured and adapted by a user.

The fact that a respective sensitive detection volume of a pixel element is directly connected to the analog part of the signal preprocessing enables analog signal preprocessing with minimum impedance, low noise and low power consumption. Herein, the amplified analog output signal of the signal amplifier is preferably directly connected to the at least one or more comparators. This enables high switching rates and precise timing and produces a digital pixel signal which is robust with respect to forwarding to the digital logic elements connected to the switching matrix via signal technology.

Therefore, the architecture according to the invention enables a particularly advantageous analog performance of near-the-sensor signal processing and digitization to be combined with the flexibility of a high-grade configurable digital processing chain.

The implementation according to at least one embodiment of the invention of the X-ray detector also enables resource-efficient usability of the evaluation unit, including, for example, with a high pixel-pitch (for example, the provision of an electrically conductive connection between the evaluation unit and converter element only with every second pixel electrode). To be specific, the pixel electrodes and the corresponding first signal processing stages coupled thereto which are not connected to a sensor pixel electrode via the electrically conductive connection can be simply deactivated or remain unused in the switching matrix. On the other hand, the pixels used can, for example, still be connected in a coincidence logic to their actual neighbors.

For this, it can advantageously be expediently provided that the X-ray detector according to the invention or the at least one switching matrix can be configured via adjustable register parameters so that different digital processing chains can be provided for the digital pixel signals as a function of the adjusted register parameters.

The register parameters can, for example, be adaptable, i.e. substantially programmable, via a control interface of the X-ray detector. This enables the logic of the switching matrix to be reparametrized and thereby adapted by the adaptation of the register parameter values for different measurements and/or applications.

This can advantageously also enable automatic parameterization in a simple manner. For example, multiple sets of register parameter values can be held externally in a storage unit or also in multiple registers of the switching matrix.

A set of register parameter values can in each case be present as a function of an X-ray application. The choice of a specific X-ray application, for example in respect of an object to be examined, a specific recording region, a course of an application or a specific recording modality, to a large extent permits conclusions to be drawn regarding the recording conditions during the recording of the X-ray image data set, a desired image quality and/or target image information and thereby advantageously allows demand-driven adaptation of the X-ray detector.

The sets of register parameter values can also, for example, be linked to one or more application parameters. An application parameter can be a parameter of the X-ray application and/or of the medical imaging device to which the X-ray detector according to the invention is assigned and/or to which it is structurally connected.

This means that an application parameter can be directly linked to an X-ray application or derivable therefrom. For example, the application parameter can be based on an X-ray flux, a point in time or a duration, a control parameter of the medical X-ray device, for example an X-ray tube current or an X-ray tube voltage, an image parameter of the X-ray image data set to be recorded, for example a spectral resolution or a spatial resolution.

In addition, an application parameter can also, for example be based on boundary conditions predetermined by the medical imaging device to which the X-ray detector according to the invention is assigned, for example the available cooling power or the power supply.

Advantageously, simple and optionally automatic configuration of the X-ray detector is possible so that the most favorable configuration of the X-ray detector can be always be provided for an X-ray application, the given boundary conditions of a medical X-ray device and/or a measurement.

In a further embodiment of the photon-counting X-ray detector, a first processing chain can be provided for a first number of the signal outputs of the group of pixel elements and a second processing chain different from the first processing chain can be provided for a second number of signal outputs.

Advantageously flexible configuration and demand-driven adaptation of the signal processing is possible.

Herein, different processing chains can be provided for different signal outputs of a pixel element. For example, depending on the requirements, an interconnection to coincidence logics or to a summation circuit can be provided for a part of the signal outputs of a pixel element. For example, this can enable an independent configuration of spatial and spectral resolution in that partially digital pixel signals from a pixel element can be transmitted in full spatial resolution, whereas another part of the digital pixel signals from the pixel element can be offset against pixel signals from other pixel elements.

Similarly, different signal processing chains can be configured in each case for the digital pixel signals from pixel elements which are subject to different boundary conditions. For example, pixel elements which are arranged on the edge within the matrix-like arrangement of the pixel elements and thereby comprise fewer directly adjacent pixel elements can be configured in a different way than pixel elements arranged in the middle.

According to an advantageously expedient embodiment variant of the photon-counting X-ray detector, the multiplicity of digital logic elements includes at least one counting element and one readout element.

This enables a simple photon-counting X-ray detector to be provided in an extremely simple configuration of the X-ray detector.

The counting element can in particular include a counter embodied to increase a counter reading of the counter by one count unit based on a received signal. Herein, the counting element can in particular include a multiplicity of counters. Therefore, the counting element can correspond to a resource block having a multiplicity of counters so that, based on multiple signal outputs, in each case a number of created digital pixel signals can be counted and at least temporarily saved. Instead of, for example, 4 counters per pixel element, it is, for example, possible for a configurable resource block, i.e. a counting element, with 48 counters to be provided which can be used by a group of, for example, 16 pixel elements in a jointly configurable manner.

The readout element can then be used to read out the counting element's counter readings thereby enabling an X-ray image data set to be created on the basis thereof.

According to a further preferred embodiment of the photon-counting X-ray detector, the multiplicity of digital logic elements also includes at least one element from the following list
a coincidence logic,
a signal-delay element,
a buffer element,
a switching element to prevent paralysis of a counting element,
a combinational logic gate,
a multiplexer,
a register element,
an element which, when triggered, creates a pulse of a fixed or configurable length or
an element which measures the point in time or the duration of a trigger.

Advantageously, it is possible to implement preferred interconnections of the X-ray detector. In particular, the multiplicity of digital logic elements includes a combination of elements in the list. In addition, it is also possible for yet further types of digital logic elements to be provided.

Furthermore, it can be provided that a digital logic element of the multiplicity of digital logic elements in the second signal processing stage is provided multiple times.

Depending on the intended use and the available space and available power, the respective digital logic elements can be provided in a different selection and number. Advantageously suitable signal processing chains can expediently be provided for the signal outputs.

In a further embodiment of the photon-counting X-ray detector according to the invention, following a configuration of the configurable switching matrix, non-interconnected digital logic elements of the multiplicity of digital logic elements can be separated from a power supply.

Advantageously, unused logic elements can be switched off. For example, this can be specified and configured via the adjustable register parameters. Advantageously, a consumption-efficient X-ray detector can be provided in each case adapted to the application and the boundary conditions. Further, targeted economical use of resources enables the same evaluation unit also to be used for applications/products in which a lower power/cooling budget is available. Alternatively, the usable performance and the functional scope of the evaluation unit can be increased in a simple manner and also subsequently by optimizing the cooling budget. Thus, the invention advantageously enables the same evaluation unit to be used in different products and/or applications and thereby to be used flexibly.

According to a further embodiment variant of the photon-counting X-ray detector, the plurality of pixel elements is divided into a multiplicity of groups of pixel elements, wherein a configurable switching matrix is assigned to each group in each case.

A group can, for example, be assigned to an ASIC in each case. However, it is possible for multiple pixel groups to be assigned to an ASIC. A group can also include a different selection of pixel elements, for example a group can be defined by the arrangement relative to an anti-scatter grid (ASG). For example, a group in each case includes an ASG pixel group which is in each case assigned to a through-channel of the ASG. Other groupings are also possible. For example, a respective group can in each case include a fixed number of pixel elements which are in a similar relationship to one another. For example, the relationship is in each case defined by their arrangement relative to one another. For example, a group of pixel elements in each case includes a pool of 8×8 or 16×16 pixel elements. Such a pool can also be called a macropixel wherein signals from the pixel elements of a pool are preferably offset against one another if required.

Dividing the plurality of pixel elements into multiple groups of pixel elements which are in each case assigned to a switching matrix advantageously enables the complexity of a respective switching matrix or the configuration of the switching matrix to be kept at a lower level.

Advantageously, the configuration of a switching matrix is simple to transfer to a plurality of switching matrices.

According to an alternative embodiment variant of the photon-counting X-ray detector of photon-counting X-ray detectors, the plurality of pixel elements is divided into a multiplicity of groups of pixel elements, wherein a common configurable switching matrix is assigned to the multiplicity of groups.

Advantageously, interconnection and signal exchange can be implemented in a simplified manner across groups of pixel elements. For example, it is possible to implement a coincidence observation across pixel groups. The groups can, for example, be defined via common external parameters. For example, the groups can in each case include an ASG pixel group or a macropixel.

Herein, in one advantageous variant, it can nevertheless be provided that the one configurable switching matrix is configurable on a group basis.

For example, the same number and selection of digital logic elements per pixel group are provided in the switching matrix in the same way in each case. For example, the configuration of a submatrix of the switching matrix can be transferred to rest of the switching matrix on a group basis, i.e. the configuration can be replicated and applied on a group basis.

In a further embodiment of the photon-counting X-ray detector according to the invention, the evaluation unit provides at least one first region for the first processing stage and one second region for the second processing stage, wherein the at least one first region is provided in the form of an island within the second region or on the edge along the second region.

The decoupling of the first substantially analog signal processing stage and second digital signal processing stage a more flexible arrangement and more flexible floor planning (planning of the arrangement of the subcircuits in the evaluation unit) of the digital and analog part of the signal processing. Advantageously, as a result, the pixel-specific circuit that can be embodied as smaller in area, i.e. the respective first signal processing stage, can also enable smaller pixel element spacings.

To be specific, decoupling the first signal processing stage and second signal processing stage can, for example, advantageously enable the region of the evaluation unit provided in the form of an island for the first signal processing stage of a respective pixel element in each case to be embedded in the form of an island within a region providing the digital signal processing stage for at least one group of pixel elements. Similarly, it can be provided, that the surface areas of the first signal processing stages of a group of pixel elements are also combined to form strips, centers or rings. For example, the first signal processing stages can in each case be arranged combined on the edge along the second region provided for the second signal processing stage. For example, the first signal processing stages can in each case be arranged combined in the middle of the second region provided for the second signal processing stage.

According to a further embodiment variant of the photon-counting X-ray detector, the evaluation unit has a layered structure, wherein the first processing stage is provided in a first layer and the second processing stage is provided in a second layer located after the first layer in the direction of radiation incidence.

This can advantageously, for example, enable the pixel-specific first signal processing stage that can be embodied as smaller in area to have smaller pixel element spacings.

In a development of this, a division of the analog and digital circuits, i.e. the respective first processing stages and the second processing stage, into separate wafer dies (separate subregions of one or different semiconductor wafers) can be provided. With such a division into separate dies, these can be combined in a die stacking process to form an evaluation unit. When the first and second signal processing stage are provided in separate dies, the analog and digital circuits are no longer tied to the same technology so that, for example, different structural sizes can be used in the provision and hence can also be optimized independently of one another. In this way, it is also, for example, possible for different pixel sizes to be achieved while the implementation of the second signal processing stage remains the same.

According to one embodiment variant, the photon-counting X-ray detector according to the invention can comprise a rewiring layer along the direction of incidence of the X-rays between the converter element and the evaluation unit.

A rewiring layer in particular comprises electrically conductive connections transferring a first spatial distribution of input contact elements to a second spatial distribution of output contact elements. Advantageously, the provision of a rewiring layer expediently enables the position of the sensor pixel electrodes and the evaluation-side pixel electrodes to be decoupled thereby enabling a flexible arrangement of the regions assigned to the circuitry parts, i.e. the first signal processing stages and the second signal processing stage of a respective group of pixel elements.

At least one embodiment of the invention also relates to a medical imaging device having a photon-counting X-ray detector according to at least one embodiment of the invention.

Herein, the features and advantages of the photon-counting X-ray detector can be transferred directly to the medical imaging device.

The medical imaging device can in particular be embodied as a medical X-ray device. The medical imaging device can in particular include an X-ray source assigned to the photon-counting X-ray detector for exposing the X-ray detector. The medical imaging device usually includes at least one photon-counting X-ray detector according to at least one embodiment of the invention and in comparison thereto at least one X-ray source, for example an X-ray tube. To record the X-ray image data set, it is then in particular possible for an object to be mapped to be positioned between the X-ray source and the photon-counting X-ray detector and irradiated via the X-ray source.

The medical imaging device can in particular be embodied as a computed tomography system. However, it can also, for example, be embodied as a C-arm X-ray device and/or Dyna CT or in some other way.

At least one embodiment of the invention also relates to a method for operating a photon-counting X-ray detector embodied according to one of the above-described variants for creating an X-ray image data set, wherein the at least one switching matrix can be configured via adjustable register parameters comprising a. adapting the adjustable register parameters based on a first set of register parameter values, b. configuring the at least one configurable switching matrix based on the adapted register parameters and thereby in each case providing a digital processing chain for at least one part of the signal outputs of the first signal processing stage of the at least one group of pixel elements which is coupled to the at least one switching matrix via signal technology, c. receiving X-rays via the X-ray detector on the basis of which electric signals are created in the converter element, d. processing the electric signals created via the first processing stage and the second processing stage of the photon-counting X-ray detector, wherein digital pixel signals are provided at a respective signal output of the first signal processing stage of a pixel element of the at least one group of pixel elements of the plurality of pixel elements which are further processed via the digital processing chain provided in the second signal processing stage for a respective signal output, e. outputting the processed digital pixel signals on the basis of which an X-ray image data set is ascertained.

Herein, the X-ray detector is assigned to an X-ray source for emitting X-rays.

The possibility of adapting the register parameter values of the register parameters advantageously enables the switching matrix logic for different measurements and/or applications to be simply and repeatedly parameterized and thereby adapted.

In one embodiment variant of the method according to the invention, in one step of the second adaptation, the adjustable register parameters are adapted based on a second set of register parameter values, wherein in one step of the second configuration of the at least one configurable switching matrix via the second set of register parameter values, a second digital processing chain different from the first is provided for at least one part of the signal outputs of the first signal processing stage of the at least one group of pixel elements.

According to an advantageous method variant, the first and/or second set of register parameter values is determined as a function of an X-ray application.

The choice of an X-ray application, for example in respect of an object to be examined, a specific recording region, the course of an application or a specific recording modality, to a large extent determines the recording conditions during the recording of the X-ray image data set, as well as a desired image quality and/or target image information.

The determination of the register parameter values as a function of the X-ray application thereby advantageously in each case advantageously allows demand-driven adaptation of the X-ray detector.

In the context of the invention, features described with respect to different embodiments of the invention and/or different claim categories (method, use, apparatus, system, arrangement etc.) can be combined to form further embodiments of the invention. For example, a claim relating to an apparatus can also be developed with features described or claimed in conjunction with a method and vice versa. Herein, functional features of a method can be implemented by correspondingly embodied material components. In addition to the embodiments of the invention expressly described in this application, numerous further embodiments of invention are conceivable at which the person skilled in the art can arrive without departing from the scope of the invention as defined by the claims.

The use of the indefinite article "a" or "an" does not preclude the possibility of the feature in question also being present on a multiple basis. The use of the expression "comprise" does not preclude the possibility of the terms linked by the expression "comprise" being identical. For example, the medical imaging apparatus comprises the medical imaging apparatus. The use of the expression "unit" does not preclude the possibility of the subject matter to which the expression "unit" relates comprising multiple components that are spatially separated from one another.

In the context of the present application, the expression "based on" can in particular be understood in the sense of the expression "using". In particular, wording according to which a first feature is created based on a second feature (alternatively: ascertained, determined etc.) does not preclude the possibility of the first feature being created based on a third feature (alternatively: ascertained, determined etc.).

FIG. 1 is a schematic view of an example embodiment of an X-ray detector 1.

In this example, the X-ray detector according to an embodiment of the invention 1 is part of a detector module with multiple X-ray detectors 1 according to an embodiment of the invention. In a preferred embodiment, the detector module comprises a two-dimensional matrix or an arrangement of multiplicity of X-ray detectors 1. A respective X-ray detector 1 in turn comprises a plurality of pixel elements 5 in a matrix-like arrangement.

In the example shown, a respective X-ray detector 1 comprises a converter element 3. The converter element 3 can be embodied as a flat-panel direct converter comprising, for example, CdTe, CZT, CdZnTeSe, CdTeSe, CdMnTe, InP, TlBr2, HgI2, GaAs, Si or other converter materials. The upper side of the converter element 3 has a first electrode 18 (top electrode). The underside of the converter element 3 has sensor pixel electrodes 16. The sensor pixel electrodes 16 are connected via the electrically conductive connections 69 and the pixel electrodes 57 to the evaluation unit 59. The evaluation unit 59 can, for example, include an ASIC ("application specific integrated circuit"). The electrically conductive connections 69 can, for example, be embodied as bump bonds or soldered material in conjunction with copper pillars or also in some other way. The total number of sensor pixel electrodes 16, the number of conductive connections 69, the number of pixel electrodes 57 and the number of pixel elements 5 are the same as a rule. An electric field between the first electrode 18 and a respective sensor pixel electrode 16 determines a sensitive detection volume in the converter element 3 assigned in each case to one pixel element 5 of the plurality of pixel elements 5.

In the example shown, according to an advantageous embodiment, in addition a rewiring layer 65, also called an interposer, is arranged between the converter element 3 and the evaluation unit 59 of a respective X-ray detector 1.

A rewiring layer 65 comprises in particular electrically conductive connections transferring a first spatial distribution of input contact elements to a second spatial distribution of output contact elements. The input contact elements of the rewiring layer 65 are then in particular arranged on a side of the rewiring layer 65 facing the sensor pixel electrodes 16 and coupled thereto via signal technology. The output contact elements are then in particular arranged on side of the rewiring layer 65 facing the pixel electrodes 57 of the evaluation unit 59 and coupled thereto via signal technology. Herein, the spatial distribution of the input contact elements substantially corresponds to the spatial distribution of the sensor pixel electrodes 16. The spatial distribution of the output contact elements then substantially corresponds to the pixel electrodes 57 of the evaluation unit 59. The rewiring layer 65 can also be applied in direct contact and on the converter element 3 or in direct contact and on the evaluation unit 59.

In the example shown, the rewiring layer 65 extends over a multiplicity of evaluation units 59 and converter elements 3. This can in particular be advantageous for the stability of the X-ray detector. However, other embodiments are also possible. Similarly, embodiment variants are possible in which multiple evaluation units 59 are assigned to a common planar converter element 3.

In addition, the X-ray detector 1 or the X-ray detector module can also include still further components, not shown here, for example a substrate or peripheral electronics.

The evaluation unit 59 is embodied to process electric signals caused by X-rays arriving at the converter element 3. According to an embodiment of the invention, herein each pixel element 5 of the plurality of pixel elements 5 of the X-ray detector 1 comprises a first, in particular pixel-by-pixel, signal processing stage for processing the electric signals, wherein a digital pixel signal is provided at a respective signal output 7 of the first signal processing stage of a respective pixel element 5 of the plurality of pixel elements.

Furthermore, according to an embodiment of the invention, the signal outputs 7 of the first signal processing stage of at least one group 20 of pixel elements 5 of the plurality of pixel elements 5 are coupled to a common second signal processing stage via signal technology. The second signal processing stage then serves in particular for digital further processing of the digital pixel signals provided of the group 20 of pixel elements 5.

Figure 2:
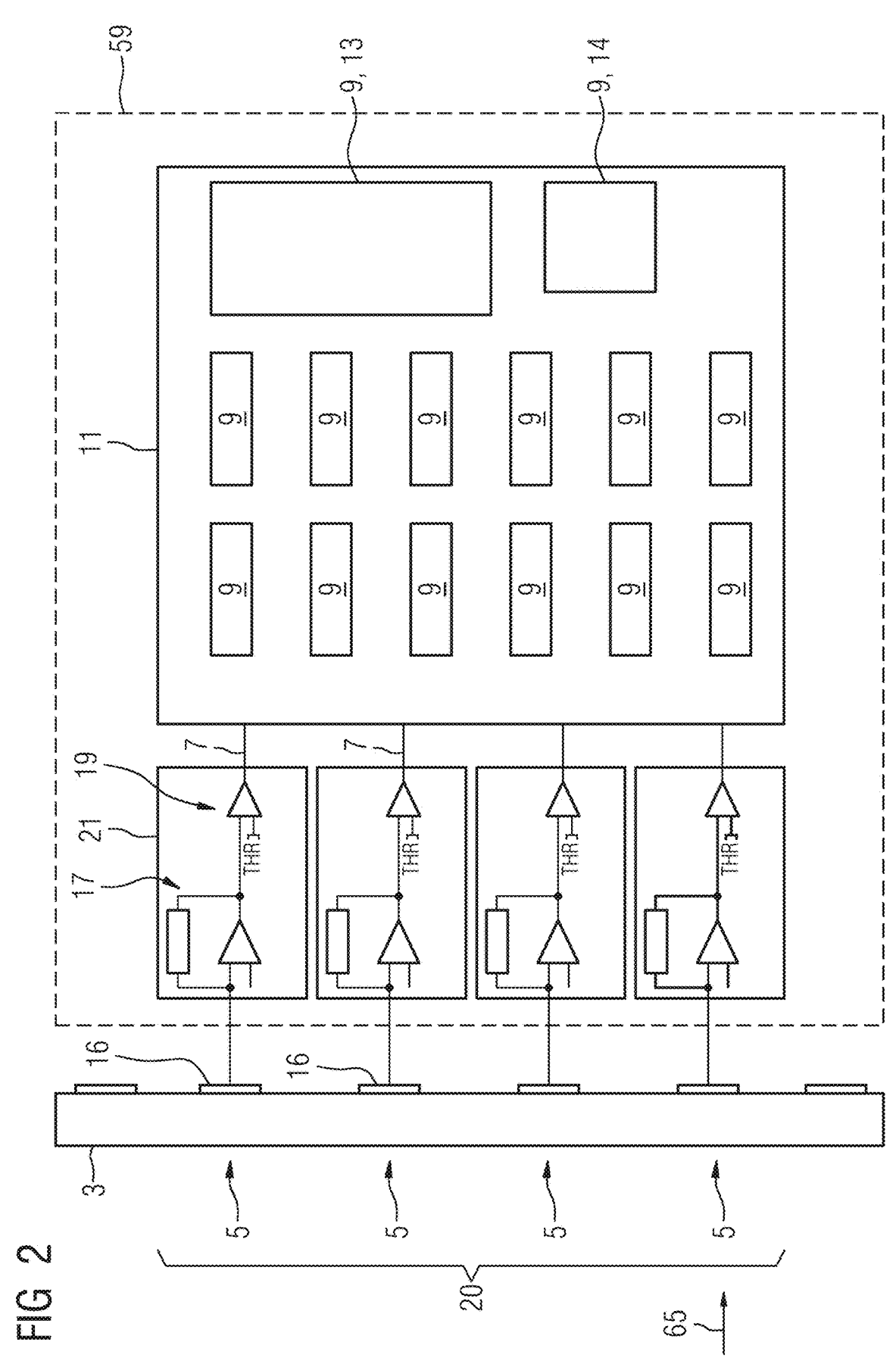
FIG. 2 a schematic representation to illustrate an interconnection via signal technology of a group of pixel elements 5 with a first and a second signal processing stage, FIG. 3 a schematic representation to illustrate an interconnection via signal technology of multiple groups of pixel elements 5 with a first and a second signal processing stage, FIG. 4 a schematic representation to illustrate an interconnection via signal technology of a group of pixel elements 5 with an example processing chain according to a first configuration variant, FIG. 5 a schematic representation to illustrate an interconnection via signal technology of a group of pixel elements 5 with an example processing chain according to a second configuration variant, FIG. 6 a schematic representation to illustrate an interconnection via signal technology of a group of pixel elements 5 with an example processing chain according to a third configuration variant, FIG. 7 to FIG. 10 in each case an illustration of an example relative arrangement of the regions of an evaluation unit provided for a first and a second processing stage, FIG. 11 an example medical imaging device and FIG. 12 a schematic view of the sequence of a method for operating a photon-counting X-ray detector for creating for an X-ray image data set.

FIG. 2 shows a schematic representation to illustrate an interconnection via signal technology of a group 20 of pixel elements 5 of the plurality of pixel elements 5 with a first and a second signal processing stage in a greatly abstracted form.

Herein, the number of the pixel elements 5 in a group 20 is purely by way of example and selected for illustration purposes only. It is also possible for more or fewer pixel elements 5 to be assigned to a group 20.

The sensor pixel electrode 16 assigned to a respective pixel element 5 in the group 20 is coupled to the first signal processing stage provided in the evaluation unit 59 via signal technology. In particular, each pixel element 7 comprises a first pixel-by-pixel signal processing stage.

The first signal processing stage of a pixel element 5 for the processing of the signals fed in by the converter element 3 in each case comprises at least one signal amplifier 17 and at least one comparator 19. The comparator has at least one adjustable threshold value THR.

An incoming signal via the pixel electrode is amplified in the first signal processing stage of a pixel element 5 via the signal amplifier 17 and the amplified signal is compared via the at least one comparator 19 with at least the threshold value THR representing an energy threshold. If the signal exceeds the threshold value THR, an output signal is output at the signal output 7. In particular, a digital pixel signal is provided at the signal output 7 of the first signal processing stage.

The first signal processing stage of a pixel element 5 of the plurality of pixel elements 5 can also comprise more than one comparator 19 each with one threshold value THR so that multiple digital pixel signals can be provided as a function of the multiple threshold values THR at multiple signal outputs 7 of a pixel element 5 of the plurality of pixel elements.

The signal outputs 7 of the first signal processing stage of at least the group 20 of pixel elements 5 of the plurality of pixel elements 5 are further coupled to a common second signal processing stage via signal technology.

The common second signal processing stage has a multiplicity of digital logic elements 9 for digitally processing the digital pixel signals provided at the signal outputs 7. The multiplicity of digital logic elements 9 provided in the second signal processing stage can be understood to be common resource elements provided for the digital signal processing of the digital pixel signals which can be used jointly for the signal processing of the digital pixel signals from the pixel elements 5 in the group of the plurality of pixel elements.

The common second signal processing stage also includes a configurable switching matrix 11 for interconnecting via signal technology at least one partial number of the multiplicity of digital logic elements 9 with the respective signal outputs 7 of the first signal processing stage of the group 16 of pixel elements 5 of the plurality of pixel elements.

Following a configuration of the switching matrix 11, a processing chain can then be provided for the digital processing of the digital pixel signals provided for each signal output 7 of the first signal processing stage of the group 16 of pixel elements 5 of the plurality of pixel elements.

Therefore, the processing chain can in particular represent interconnection and series connection of a selection of digital logic elements 9 and a respective signal output 7 so that the interconnection enables the digital processing of a digital pixel signal output at the signal output 7.

Herein, the switching matrix 11 can be embodied similarly to an FPGA ("field-programmable gate array"). This means that the switching matrix 11 can be embodied as an integrated circuit into which a logic circuit can be loaded, wherein the desired circuit structure can be defined, i.e. adapted, by programming or configuring the switching matrix 11 (not only a specification of time sequences, but also.

Herein, the selection of digital logic elements 9 includes at least a partial number of the digital logic elements 9 provided. The logic elements can in each case be interconnected with one or more signal outputs 7 of the first signal processing stage and/or in each case again with one or more digital logic elements 9.

Herein, following a configuration, a first processing chain can be provided for a first number of the signal outputs 7 of the group 16 of pixel elements 5 and a second processing chain different from the first processing chain can be provided for a second number of signal outputs 7.

According to a further advantageous embodiment variant, the configurable switching matrix 11 can also in particular be configured by way of adjustable register parameters, so that different digital processing chains can be provided for the signal outputs 7 as a function of the adjusted register parameters.

According to a preferred variant, herein the multiplicity of digital logic elements 9 includes at least one counting element 13 and one readout element 14.

This enables a simple photon-counting X-ray detector to be provided in an extremely simple configuration of the X-ray detector 1 which counts the number of directly incoming signals in a pixel element 5 as a function of the threshold values THR provided for a respective pixel element 5 on the basis of which an X-ray image data set can be compiled.

A counting element 13 can include a counter. A counter can in particular be embodied to increase a counter reading by one count unit when a signal is received. The counter can, for example, include a so-called "rising edge counter" or "falling edge counter" (counter based on a rising edge or based on a falling edge of a signal). Herein, the counting element 13 can preferably include a multiplicity of counters. Therefore, the counting element 13 can correspond to a resource block having a multiplicity of counters so that, for example based on multiple signal outputs 7 coupled to the counting element 13, in each case the number of digital pixel signals created can be counted and at least temporarily saved.

A readout element 14 can then be used to read out the counter readings of the counting element 14. A readout element 14 can, for example, include a shift register or a so-called readout tree.

In addition, according to an advantageously expedient embodiment variant, the multiplicity of digital logic elements 9 can also include at least one element from the following list: a coincidence logic, a signal-delay element, a buffer element, a switching element to prevent paralysis of a counting element, a combinational logic gate, a multiplexer, a register element, an element which, when triggered, creates a pulse of a fixed or configurable length, an element which measures the point in time or the duration of a trigger.

The provision of at least one or more of the named elements advantageously enables the implementation of expedient interconnections for the use of the photon-counting X-ray detector.

A coincidence logic enables, for example, coincidences between two or more pixel elements 5 of the plurality of pixel elements to be registered. The collection of coincidence information and the inclusion of the coincidence information in the X-ray image data set can enable improved spatial resolution and/or spectral resolution.

A signal-delay element can in particular advantageously be used to compensate differences between two digital pixel signals, for example by different line lengths.

A switching element to prevent paralysis can advantageously be used to improve the X-ray detector's high flux behavior. Such a switching element can induce further signals if a comparator threshold is permanently exceeded. Such a switching element can, for example, be embodied as a pile-up trigger (see, for example, Kraft et al. "Experimental evaluation of the pile-up trigger method in a revised quantum-counting CT detector", Proc. SPIE 8313, Medical Imaging 2012: Physics of Medical Imaging, 83134A (2012); https://doi.org/10.1117/12.911231) or as a so-called "instant retrigger" (Loeliger et al. "The new PILATUS3 ASIC with instant retrigger capability", 2012 IEEE Nuclear Science Symposium and Medical Imaging Conference Record (NSS/MIC) (2012); https://doi.org/610-615.10.1109/NSSMIC.2012.6551180), the entire contents of each of which is hereby incorporated herein by reference. A combinational logic gate can include AND, NAND, OR, NOR, XOR or NOT gates. Advantageously, this can be used as the basis for the implementation of different arithmetic or logic functions, for example the addition or subtraction of signals. It is also possible to implement elements for data transmission, for example a multiplexer, demultiplexer, encoder, decoder.

A multiplexer can, for example, advantageously switch through one of a number of input signals selected at the multiplexer output.

An element which, when triggered, creates a pulse of fixed or configurable length, can, for example, permit a so-called "time-over-threshold" measurement (duration for which a threshold is exceed) which is widely known in the field of photon-counting detectors. An element which measures the point in time or the duration of a trigger, can, for example, permit a so-called "time-of-arrival" measurement (arrival time of a signal), which is widely known in the field of photon-counting detectors. For example, this can advantageously be used for the collection of coincidence information.

A register element can advantageously enable configuration by way of register parameters filed in the register element, synchronization, and/or reading out.

A buffer element can advantageously be provided to drive nodes with higher loads.

In addition, other types of logic elements can also be provided. For example, a logic element can be provided that triggers on the occurrence of a (specific or configurable) pattern at its inputs. Similarly, connecting elements to one or more clock signals can be provided or monitoring elements (for example digital buffers for the external observation of a signal).

Preferably, it is in particular possible for a respective logic element 9 of the multiplicity of logic elements 9 in the second signal processing stage also to be provided on a multiple basis. Then, depending upon the intended use and the available space and available power, the respective digital logic elements 9 can be present in a suitable selection and number for an expedient provision of signal processing chains for a multiplicity of signal outputs 7.

Advantageously, during a planning and synthesis of the digital logic, it is also possible to ensure by suitable positioning or suitable synthesis boundary conditions to ensure that the typical connection paths and node impedances are optimized, particularly in the fast-switching region. For example, it can be advisable to position the coincidence logics distributed in each case between adjacent pixel elements 5.

It can advantageously be provided for a resource-saving and consumption-efficient X-ray detector 1 that, following a configuration of the configurable switching matrix 11, non-interconnected logic elements 9 of the multiplicity of logic elements 9 are separated from a power supply.

According to a further embodiment variant of the photon-counting X-ray detector 1, the plurality of pixel elements 5 is divided into a multiplicity of groups 20 of pixel elements 5, wherein in each case a configurable switching matrix 11 is assigned to each group 20. For example, a group can in each case be assigned to an ASIC. A group can also include a different selection of pixel elements 5, for example an ASG pixel or a macropixel in each case.

Nevertheless, it is possible for connections via signal technology to be provided between the groups 20, i.e. therefore also between the switching matrices, so that signal exchange across groups, for example for a coincidence observation, is also possible.

Figure 3:
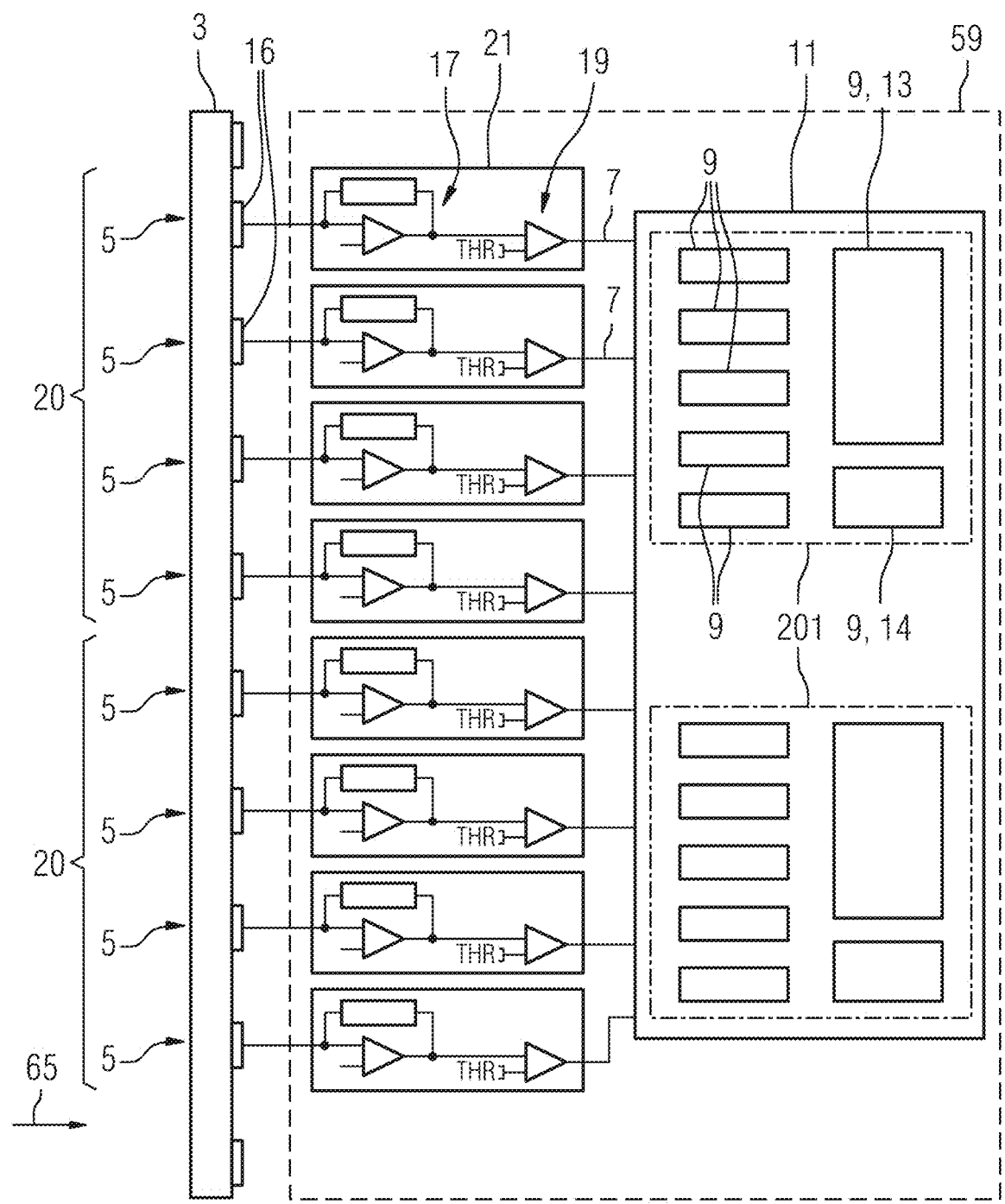

As indicated schematically in FIG. 3, it is also possible for multiple groups 20 of pixel elements 5 to be assigned to a switching matrix 11. This means that the plurality of pixel elements 5 is divided into a multiplicity of groups 20 of pixel elements 5, wherein the multiplicity of groups 20 are together assigned a configurable switching matrix 11.

Herein, however, it can preferably be provided that the one configurable switching matrix 11 is configurable on a group basis so that the configuration of a submatrix of the switching matrix can be replicated to the rest of the switching matrix on a group basis.

Herein, it can be provided that the same number and selection of digital logic elements (indicated by the framing 201 in FIG. 3) is provided repeatedly for each group so that for each group 20 of pixel elements the same signal processing chains for the digital pixel signals can be configured via the switching matrix 11.

The ability to configure the switching matrix 11 and thereby the signal processing chains produces a plurality of possibilities for the signal processing. For example, the selection and interconnection of the logic elements can be adapted according to the X-ray application: in the case of very low X-ray fluxes, for example in the context of screening applications, a configuration with weighted pixel fusing (combining the digital pixel signals from multiple pixel elements) or with maximum spatial and/or spectral resolution can be advantageous.

On the other hand, in the case of a high-flux application, it is possible, for example, to activate the use of coincidence logics to reduce or measure the negative influence of charge sharing/pulse pile up. In the case of examinations requiring high spatial resolution (for example, auditory examinations or for osteoporosis) a configuration which utilizes the counter resources to maximize the spatial resolution and for this measures the signals as a function of a lower number of spectral thresholds can be advantageous.

In the case of examinations which tend to require high soft-tissue contrast or precise material identification, an opposite configuration (noise reduction through lower spatial resolution, weighted pixel fusing, high number of spectral thresholds or spectral weighting) can be advantageous.

On the other hand, in the case of time-critical examinations (for example in cardiology or in the emergency room) measurement with maximum image frequency can be desirable in order to minimize scan duration and movement artifacts. This can be achieved by a configuration with a minimum data volume.

Reducing the spectral resolution and spatial resolution (by combining adjacent pixels) enables the raw data volume to be reduced for example. This can, for example, be achieved by way of summation of the comparator signals from adjacent pixels (ORing) or by the addition of adjacent counter readings directly on the chip. In addition to enabling shorter readout intervals, this in in particular has the advantage that power consumption also drops simultaneously during readout. In the case of examinations with unclear or polymorbid questions (patients with multiple illnesses), on the other hand, it may be advisable to have a configuration that offers less speed but provides the maximum amount of information in one single scan.

Further, the spatial and spectral resolution can also be configurable independently of one another. A specific example can, for example, include measuring a first and second threshold in full spatial resolution but only measuring a third threshold with half spatial resolution however providing the free counter resources for a coincidence counter in conjunction with the first threshold.

Advantageously, it is also possible to provide the flexibility and performance of the coincidence circuits in an improved manner. Depending on the application, the flexible interconnection is, for example, also able to ascertain higher order coincidences, for example a coincidence of a second higher-energy threshold THR in a pixel element with a signal with a first lower-energy threshold value of an adjacent pixel.

Figure 4:
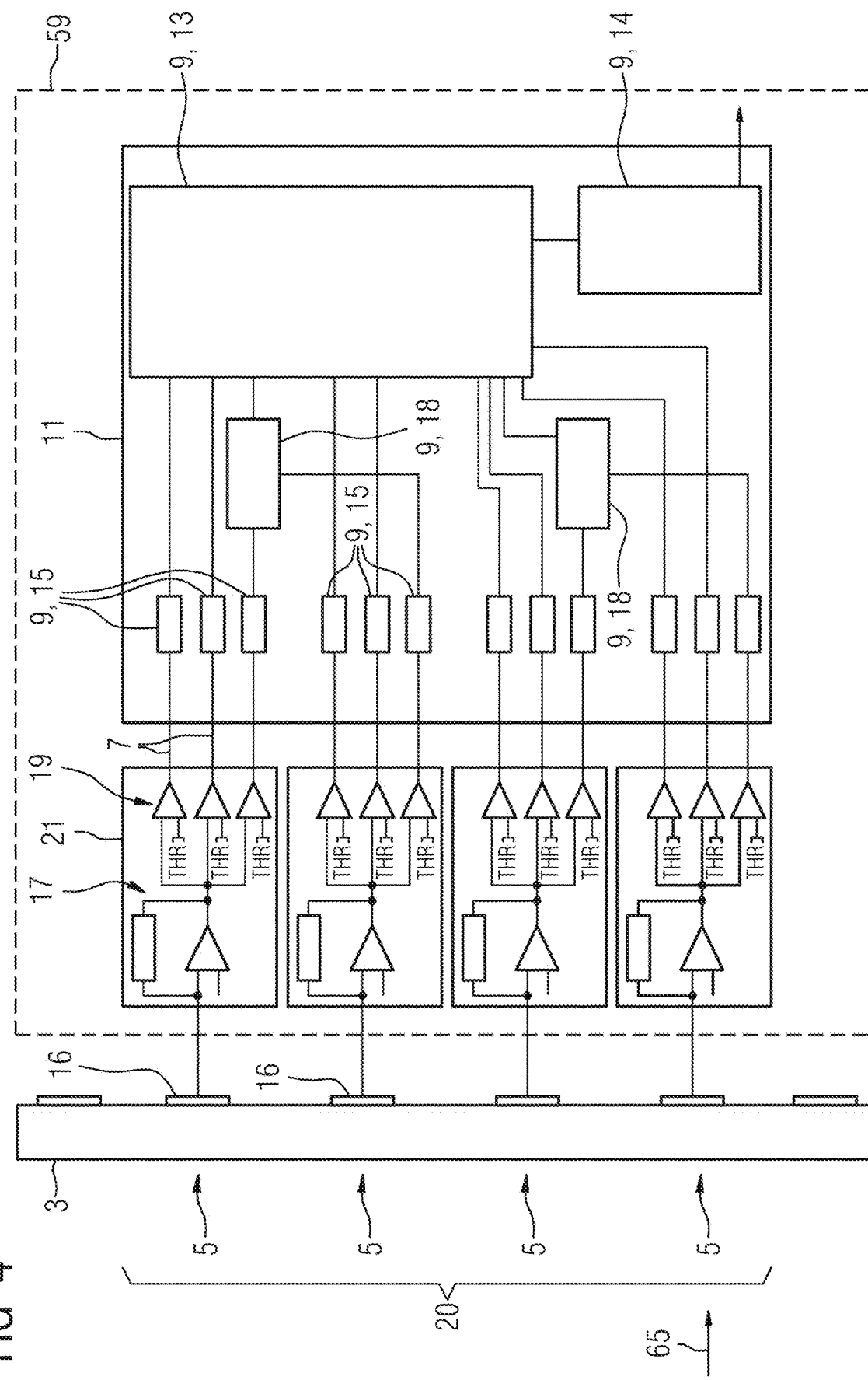
Figure 5:
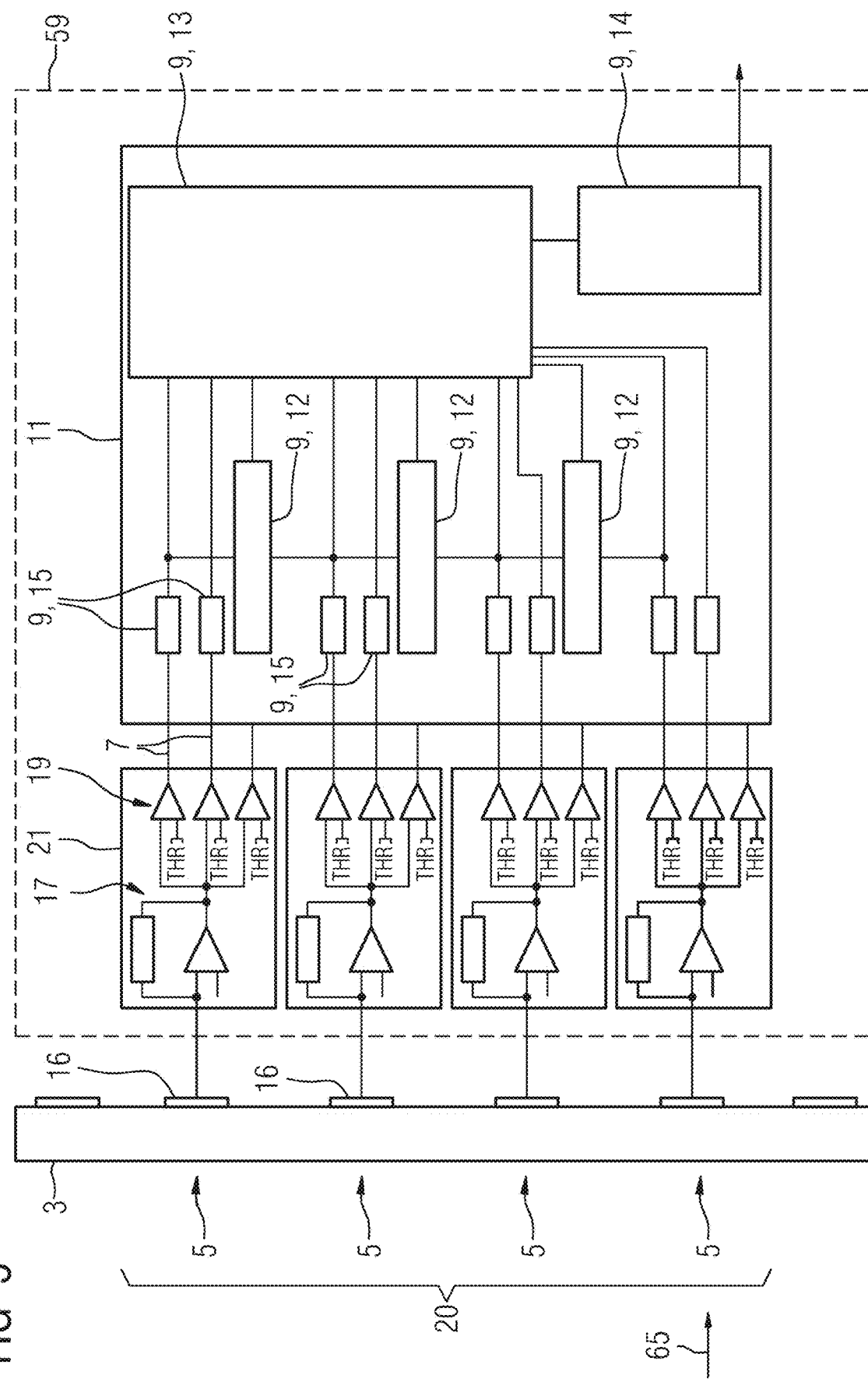

FIG. 4 shows a schematic representation to illustrate an interconnection via signal technology of a group 20 of pixel elements 5, wherein an example processing chain according to a first configuration variant is illustrated.

In particular, the depiction only indicates, by boxes, the digital logic elements 9 which are interconnected in this simplified variant. In addition, further logic elements 9, not shown here, can be provided in the second signal processing stage.

In this variant, the first pixel-by-pixel signal processing stage of a respective pixel element 5 comprises three comparators 19 and in each case three signal outputs 7. Each signal output 7 of the pixel elements in the group 20 is coupled to the common second signal processing stage having the configurable switching matrix 11 and the multiplicity of logic elements 9.

The signal outputs 7 of the respective first and second comparator 19 of each pixel element 5 are interconnected with the counting element 13 having a multiplicity of counters so that in each case a number of digital pixel signals can be counted based on the output signals from the respective first and second comparators 19 as a function of the threshold values THR.

In addition, together with the corresponding signal output 7 of an adjacent pixel element 5, the signal output 7 of the respective third comparator 19 of a pixel element 5 is connected to the counting element 13 via a summation element 18 so that a summed number of pixel signals from two adjacent pixel elements 5 in each case is counted as a function of the threshold value THR of the third comparator 19 in each case.

The result of this is that, in this configuration variant, digital pixel signals are counted in full spatial resolution based on the first and the second comparator threshold THR, while the third comparator threshold THR is only measured with half spatial resolution. Herein, it is assumed that the threshold values of the pixel signals are set as the same. This means that the respective first comparator 19 in each case has the same energy threshold across all pixel elements 5, similarly to the respective second comparator 19 and the respective third comparator 19.

In addition, in this example, every signal output 7 is interconnected with an element to prevent paralysis of the respective coupled counter for improved high-flux behavior.

FIG. 4 shows a schematic representation to illustrate an interconnection via signal technology of a group 20 of pixel elements 5, wherein an example processing chain according to a second configuration variant is depicted.

In this variant, the first pixel-by-pixel signal processing stage of a respective pixel element 5 again comprises three comparators 19 and three signal outputs 7 in each case. However, in each case only the digital pixel signals which are provided based on the signal outputs 7 of the first two comparators 19 are further processed. For this, based on the respective first comparator 19 of two adjacent pixel elements 5, in each case the signal outputs 7 are additionally coupled to a coincidence logic 12.

Consequently, in this variant, signals based on the first two threshold values of each pixel element 5 are again counted via the counting element 13 and in addition coincidentally occurring signals between two adjacent pixel elements 5 in each case. In this example, spectral resolution is dispensed with in order in return to collect the coincidence information between two adjacent pixel elements 5 in each case.

FIG. 6 shows a schematic representation to illustrate an interconnection via signal technology of a group 20 of pixel elements 5, wherein an example processing chain according to a third configuration variant is depicted.

In this case, the digital pixel signals from corresponding comparators 19 of in each case two adjacent pixel elements 5 are merged via a summation logic 18 and counted via the counting element 13 thus enabling lower spatial resolution but also a reduced data volume and thereby a faster recording frequency.

Herein, the above-described configuration variants represent simple interconnections for an example illustration. In addition, much more complex configuration variants can be implemented and derived in a simple manner from the described variants.

FIGS. 7 to 9 in each case illustrate an example relative arrangement of the regions of an evaluation unit 59 provided for a first and a second processing stage, wherein said evaluation unit provides the first processing stage and the second processing stage for the at least one group 20 of pixel elements 5 of the plurality of pixel elements.

The region can be understood as a surface area of the evaluation unit 59. A respective surface area 59 can in particular be embodied in a planar manner perpendicular to the direction of radiation incidence or stacking direction of the arrangement of the converter element 3 and evaluation unit 59.

According to one variant of the X-ray detector 1, the evaluation unit 59 can provide at least one first region 61 for the first processing stage and one second region 63 for the second processing stage, wherein the at least one first region 61 is provided in the form of an island within the second region 63 as illustrated by way of example in FIGS. 7 and 8.

According to one embodiment variant of the X-ray detector 1, however, the evaluation unit 59 can also provide at least one first region 61 for the first processing stage and one second region 63 for the second processing stage, wherein the at least one first region 61 is provided on the edge along the second region 63, as illustrated by way of example in FIG. 9.

As depicted in FIG. 7, the region 61 of the evaluation unit 59 provided for the first signal processing stage of a respective pixel element 5 can in each case be embedded in the form of an island within the region 63 which provides the digital signal processing stage for a group 20 of pixel elements. Herein, the region 63 of the digital signal processing stage can, for example, occupy the entire area of the pixel group.

Similarly, it can be provided that the regions of the first signal processing stages of a group of pixel elements are also combined to form strips, centers or rings. For example, the first signal processing stages can be arranged combined in the middle and in the form of an island as illustrated in FIG. 8. For example, the first signal processing stages can be arranged combined in each case on the edge along the second region 63 as illustrated in FIG. 9.

FIG. 10 shows an illustration of a further example relative arrangement of the first and a second processing stage, wherein the evaluation unit 59 has a layered structure and wherein the first processing stage is provided in a first layer 62 and the second processing stage is provided in a second layer 64 located after the first layer 62 in the direction of radiation incidence 65.

In a development thereof, the analog and digital circuits, i.e. the respective first processing stages and the second processing stage, can be divided into separate wafer dies (separate subregions of one or different semiconductor wafers) which can then be combined to form an evaluation unit 59.

Figure 11:
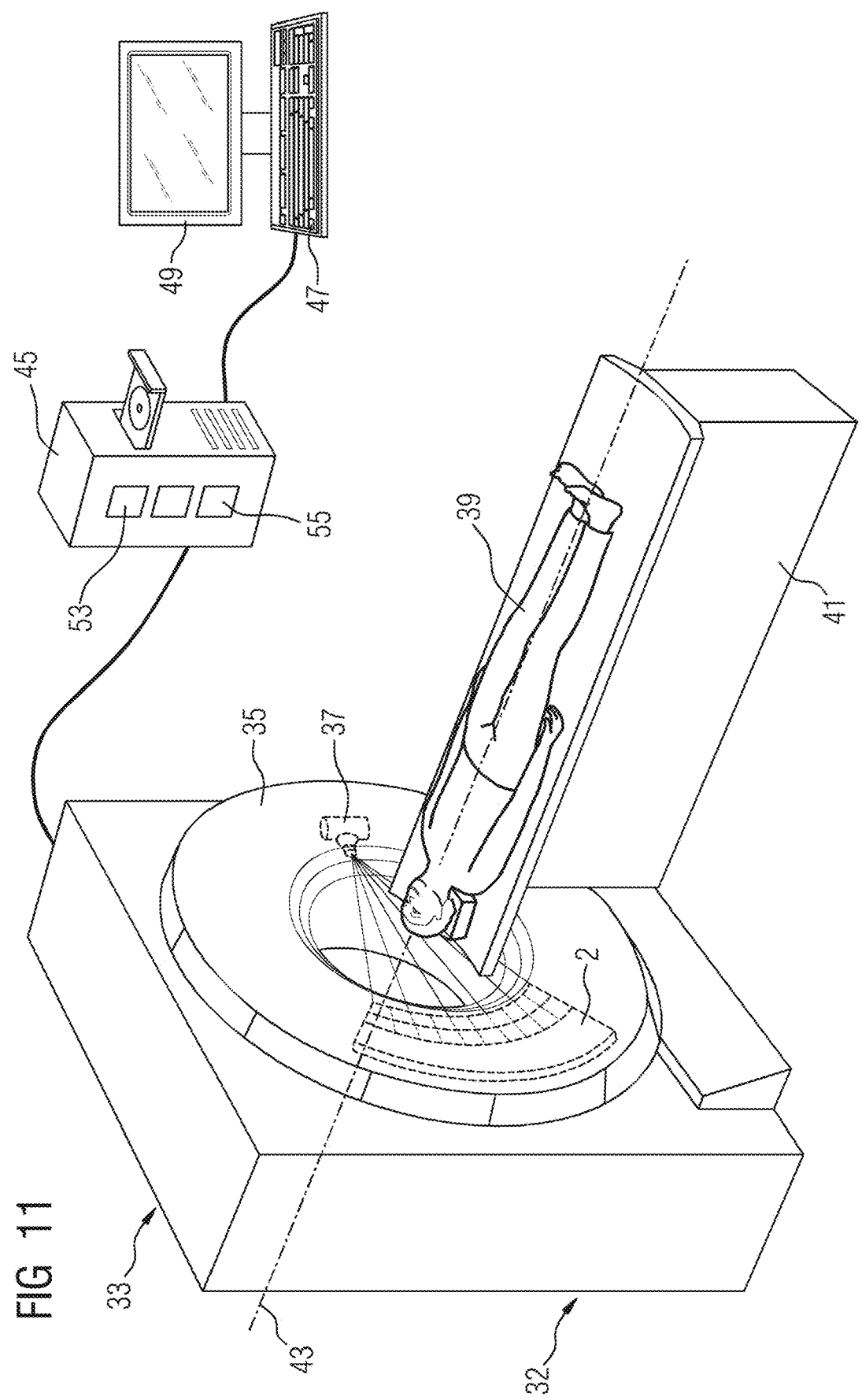

FIG. 11 shows an example embodiment of a medical imaging device according to the invention in the form of a computed tomography system 32. The computed tomography system 32 has a gantry 33 with a rotor 35. The rotor 35 comprises a detector apparatus 2 and a radiation source 37, for example an X-ray tube for exposing the detector apparatus 2. The detector apparatus 2 has at least one photon-counting X-ray detector according to the invention 1. The detector apparatus 2 can comprise a detector module with a number of X-ray detectors 1.

The object 39, here the patient, is mounted on the patient bench 41 and can be moved along the axis of rotation z 43 through the gantry 33. In general, the object 39 can, for example, be an animal patient and/or a human patient.

In the case of a computed tomography system 32 in each case a (raw) X-ray image data set of the object is usually recorded from a plurality of angular directions via the X-ray detector. The (raw) X-ray image data set is then substantially based on the processed digital pixel signals that are output. Then, a final X-ray image data set, a volume image data set or a slice image data set can be reconstructed based on the (raw) X-ray image data sets via a mathematical method, for example comprising a filtered back projection or an iterative reconstruction method.

To control the medical imaging device and/or to compile an X-ray image data set based on the measurement data recorded via the photon-counting X-ray detector 1 i.e. the processed digital pixel signals, a system control in the form of a computing unit 45 is provided.

The computing unit 45 can include a control unit 53 which can be embodied to adapt register parameter values for register parameters for the configuration of a configurable switching matrix of the photon-counting X-ray detector 1. For this, the control unit 53 can be coupled to the at least one X-ray detector via a control interface in order to transmit control commands and/or register parameter values. The control unit can also be embodied to determine a set of register parameter values as a function of an X-ray application or to request and/or ascertain application parameters for determining a suitable set of register parameter values.

The control unit 53 and/or the computing unit 45 can be implemented in the form of a computer, a microcontroller or an integrated circuit. The control unit 53 and/or the computing unit 45 can comprise hardware elements or software elements, for example a microprocessor or a so-called FPGA ("field programmable gate array"). It can also entail a real or virtual pool of computers (an English technical term for a real pool is "cluster", an English technical term for a virtual pool is "cloud").

Moreover, an input facility 47 and an output facility 49 are connected to the computing unit 45. The input facility 47 and the output facility 49 can, for example, enable an interaction, for example a manual adaptation of register parameter values, the inputting of a parameter on the basis of which register parameter values can be determined, a confirmation or triggering of a method step by a user. The medical imaging device can also include a storage unit 55.

Figure 12:
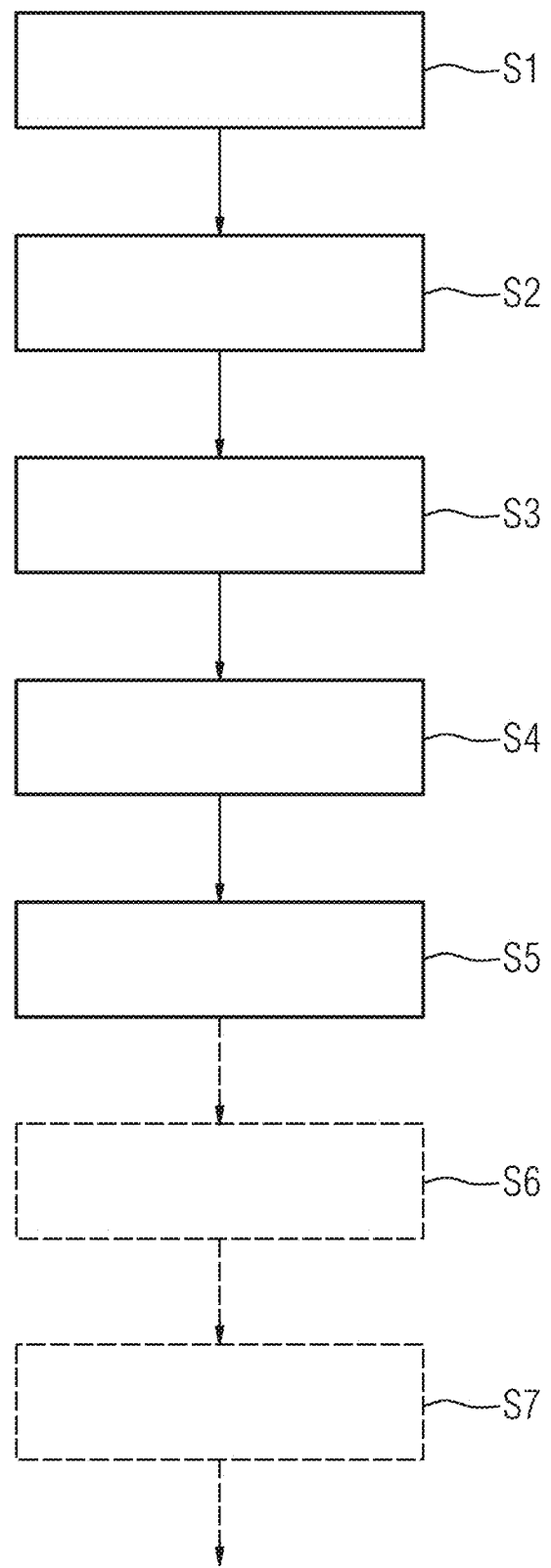

FIG. 12 is a schematic view of the sequence for operating a photon-counting X-ray detector 1 embodied according to one of the above-described variants to record an X-ray image data set, wherein the at least one switching matrix 11 can be configured via adjustable register parameters.

The method includes the step of the adaptation S1 of the adjustable register parameters based on a first set of register parameter values.

The method furthermore includes the step S2 of configuring the at least one configurable switching matrix 11 based on the adapted register parameters and thereby in each case providing a digital processing chain for at least one part of the signal outputs 7 of the first signal processing stage of the at least one group 20 of pixel elements 5 which is coupled to the at least one switching matrix 11 via signal technology. This also comprises that in each case a digital processing chain can be for all signal outputs 7 of the first signal processing stage of the at least one group 20 of pixel elements 5 which are coupled to the at least one switching matrix 11 via signal technology.

The method furthermore includes the step of receiving X-rays with the X-ray detector 1 on the basis of which electric signals are created in the converter element 3 which are processed in the step of processing S4 via the first and the second processing stage of the X-ray detector 1, wherein digital pixel signals are provided at a respective signal output 7 of the first signal processing stage of a pixel element 5 of the at least one group 20 of pixel elements 5 of the plurality of pixel elements 5 which are further processed via the digital processing chain provided in the second signal processing stage for a respective signal output 7.

The method furthermore includes the step of outputting S5 the processed digital pixel signals on the basis of which an X-ray image data set is ascertained.

According to a development of the method in one variant of the method according to an embodiment of the invention, in a step S6 of the second adaptation, the adjustable register parameters are adapted based on a second set of register parameters and wherein in a step S7 of the second configuration of the at least one configurable switching matrix 11 by way of the second set of an register parameter values a second digital processing chain different from the first is provided for at least one part of the signal output 7 of the first signal processing stage of the at least one group 20 of pixel elements 5 of the plurality of pixel elements 5.

According to an advantageous method variant, herein the first and/or second set of register parameters can be determined as a function of an X-ray application. Advantageously, the X-ray detector 1 can be optimally adapted to the instantaneous boundary conditions for the recording of the X-ray image data set and the requirements of X-ray application. Herein, an extremely flexible adaptation of the X-ray detector is possible.

For example, multiple sets of register parameter values can be held externally in a storage unit 55 or also in multiple register elements of the actual switching matrix 11. Then a set of register parameter values can be determined from the multiplicity of sets as a function of X-ray application and applied.

Herein, the sets of register parameter values can, for example, be linked to one or more application parameters related to the X-ray application. For example, an application parameter can be based on an X-ray flux, a point in time or a duration, a control parameter of the medical imaging device, for example an X-ray tube current or an X-ray tube voltage, an image parameter of the X-ray image data set to be recorded, for example a spectral resolution or a spatial resolution. The application parameters can then be used to determine an advantageous set of register parameter values.

The application parameters can, for example, be requested from an external storage unit 55, external sensor units or a control unit 53 via the X-ray detector 1. The application parameters can, for example, be measured, i.e. ascertained via the actual X-ray detector 1, for example an X-ray flux or the energy of the X-rays. Then, a set of register parameter values can be determined on the basis of the application parameters requested and/or ascertained and selected for the configuration of the switching matrix 11. The application parameters can also be requested and/or ascertained by a control unit 53 coupled to the X-ray detector 1 and then a control command and/or new register parameter values transmitted to the X-ray detector 1 via a control interface.

In addition to application parameters related to an X-ray application, other applications are also possible. For example, an application parameter can also be based on boundary conditions defined by the medical imaging device to which the X-ray detector according to an embodiment of the invention 1 is assigned, for example the available cooling power or power supply.

Advantageously, a simple and optionally automatic configuration of the X-ray detector 1 is possible so that the most favorable configuration of the X-ray detector 1 can always be provided for an X-ray application, the given boundary conditions of a medical imaging device and/or measurement.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A photon-counting X-ray detector comprising:
   a converter element to convert X-rays into electric signals, the converter element including a first electrode and a plurality of sensor pixel electrodes, wherein a detection volume of the converter element is created between each sensor pixel electrode and the first electrode; and
   a plurality of pixel elements, each sensor pixel electrode and each detection volume of the converter element being assigned to a respective pixel element of the plurality of pixel elements, wherein
      a first signal processing stage of each respective pixel element processes the electric signals from the pixel element assigned to the respective pixel element, the first signal processing stage including at least one signal amplifier and at least one comparator to provide a digital pixel signal at a respective signal output of the first signal processing stage of the respective pixel element, and
      the respective signal outputs of the first signal processing stage of at least one group of pixel elements being coupled via signal technology to a common second signal processing stage, the common second signal processing stage including
a multiplicity of digital logic elements to digitally process the digital pixel signals provided, and
a configurable switching matrix for interconnecting, via signal technology, at least one partial number of the multiplicity of digital logic elements with the respective signal outputs of the first signal processing stage of the at least one group of pixel elements, to provide, following a configuration of the configurable switching matrix, a processing chain for digital processing of the digital pixel signals provided for each respective signal output of the first signal processing stage of the at least one group of pixel elements.

2. The photon-counting X-ray detector of claim 1, wherein
a first processing chain is provided for a first number of the respective signal outputs of the at least one group of pixel elements, and
a second processing chain, different from the first processing chain, is provided for a second number of the respective signal outputs of the at least one group of pixel elements.

3. The photon-counting X-ray detector of claim 2, wherein the multiplicity of digital logic elements includes at least one counting element and one readout element.

4. The photon-counting X-ray detector of claim 3, wherein the multiplicity of digital logic elements also includes at least one of
a coincidence logic,
a signal-delay element,
a buffer element,
a switching element to prevent paralysis of a counting element,
a combinational logic gate,
a multiplexer,
a register element,
an element which, when triggered, creates a pulse of a fixed or configurable length, and
an element which measures a point in time or a duration of a trigger.

5. The photon-counting X-ray detector of claim 2, wherein a digital logic element of the multiplicity of digital logic elements is provided multiple times in the common second signal processing stage.

6. The photon-counting X-ray detector of claim 2, wherein, following a configuration of the configurable switching matrix, non-interconnected digital logic elements of the multiplicity of digital logic elements are separated from a power supply.

7. The photon-counting X-ray detector of claim 1, wherein the multiplicity of digital logic elements includes at least one counting element and one readout element.

8. The photon-counting X-ray detector of claim 7, wherein the multiplicity of digital logic elements also includes at least one of a coincidence logic,
a signal-delay element,
a buffer element,
a switching element to prevent paralysis of a counting element,
a combinational logic gate,
a multiplexer,
a register element,
an element which, when triggered, creates a pulse of a fixed or configurable length, and
an element which measures a point in time or a duration of a trigger.

9. The photon-counting X-ray detector of claim 1, wherein a digital logic element of the multiplicity of digital logic elements is provided multiple times in the common second signal processing stage.

10. The photon-counting X-ray detector of claim 1, wherein, following a configuration of the configurable switching matrix, non-interconnected digital logic elements of the multiplicity of digital logic elements are separated from a power supply.

11. The photon-counting X-ray detector of claim 1, wherein the plurality of pixel elements is divided into a multiplicity of groups of pixel elements, each respective group of the multiplicity of groups of pixel elements being assigned to a configurable switching matrix.

12. The photon-counting X-ray detector of claim 1, wherein the plurality of pixel elements is divided into a multiplicity of groups of pixel elements, the multiplicity of groups of pixel elements being assigned to a common configurable switching matrix.

13. The photon-counting X-ray detector of claim 12, wherein the common configurable switching matrix is configurable in groups.

14. The photon-counting X-ray detector of claim 1, further comprising:
an evaluation unit, the evaluation unit providing
at least one first region for the first signal processing stage, and
one second region for the common second signal processing stage for the at least one group of pixel elements, wherein the at least one first region is arranged in a form of an island within the second region or on an edge along the second region.

15. The photon-counting X-ray detector of claim 1, further comprising:
an evaluation unit having a layered structure, the evaluation unit providing
the first signal processing stage in a first layer, and
the common second signal processing stage for the at least one group of pixel elements in a second layer, wherein the second layer is located after the first layer in a direction of radiation incidence.

16. A medical imaging device, comprising:
at least one photon-counting X-ray detector as claimed in claim 1.

17. A method for operating a photon-counting X-ray detector for creating an X-ray image data set, wherein at least one configurable switching matrix of the photon-counting X-ray detector is configurable via adjustable register parameters, the method comprising:
adapting the adjustable register parameters based on a first set of register parameter values;
configuring the at least one configurable switching matrix based on the adapted register parameters, the configuring of the at least one configurable switching matrix providing a digital processing chain for at least one signal output of a first signal processing stage of at least one group of pixel elements of the photon-counting X-ray detector, the at least one group of pixel elements being coupled to the at least one switching matrix via signal technology;
receiving X-rays with the photon-counting X-ray detector, for creation of electric signals in a converter element of the photon-counting X-ray detector, the converter element including a first electrode and a plurality of sensor pixel electrodes, wherein a detection volume of the converter element is created between each sensor pixel electrode and the first electrode, each sensor pixel electrode and each detection volume of the converter element being assigned to a respective pixel element;

processing the electric signals of each respective pixel element, the processing including the first signal processing stage, the first signal processing stage providing a digital pixel signal at a signal output of the first signal processing stage of each respective pixel element, and a common second signal processing stage, the common second signal processing stage further processing the digital pixel signal via the digital processing chain, the digital processing chain being provided in the common second signal processing stage for a signal output; and outputting processed digital pixel signals, for creation of the X-ray image data set.

18. The method of claim 17, wherein the digital processing chain is a first digital processing chain, and the adapting includes adapting the adjustable register parameters based on a second set of register parameter values, and the configuring includes, configuring a second configuration of the at least one configurable switching matrix via the second set of register parameter values, and providing a second digital processing chain for the at least one signal output of the first signal processing stage of the at least one group of pixel elements, the second digital processing chain being different from the first digital processing chain.

19. The method of claim 18, wherein at least one of the first set of register parameter values and the second set of register parameter values is determined as a function of an X-ray application.

20. The method of claim 17, wherein at least one of the first set of register parameter values and a second set of register parameter values is determined as a function of an X-ray application.

* * * * *